United States Patent
Lee et al.

(10) Patent No.: US 12,413,875 B2
(45) Date of Patent: Sep. 9, 2025

(54) CHARGE DEMULTIPLEXING HIGH-SPEED CMOS TIME DELAY AND INTEGRATION IMAGING

(71) Applicant: TELEDYNE DIGITAL IMAGING, INC., Waterloo (CA)

(72) Inventors: Hyun Jung Lee, Waterloo (CA); Paul Donegan, Kitchener (CA); Nixon O, Winnipeg (CA); Sung Kuk Hong, Kitchener (CA)

(73) Assignee: Teledyne Digital Imaging, Inc., Waterloo (CA)

( * ) Notice: Subject to any disclaimer, the term of this patent is extended or adjusted under 35 U.S.C. 154(b) by 0 days.

(21) Appl. No.: 18/025,748

(22) PCT Filed: Oct. 30, 2020

(86) PCT No.: PCT/CA2020/051476
§ 371 (c)(1),
(2) Date: Mar. 10, 2023

(87) PCT Pub. No.: WO2022/051835
PCT Pub. Date: Mar. 17, 2022

(65) Prior Publication Data
US 2023/0353908 A1    Nov. 2, 2023

(30) Foreign Application Priority Data
Sep. 10, 2020   (WO) ................ PCT/CA2020/051216

(51) Int. Cl.
*H04N 25/78* (2023.01)
*H04N 25/616* (2023.01)
(Continued)

(52) U.S. Cl.
CPC ........... *H04N 25/78* (2023.01); *H04N 25/768* (2023.01); *H04N 25/77* (2023.01)

(58) Field of Classification Search
CPC ........ H04N 25/78; H04N 25/75; H04N 25/68; H04N 25/77; H04N 25/616; H04N 25/711; H04N 24/768
See application file for complete search history.

(56) References Cited

U.S. PATENT DOCUMENTS

| | | | |
|---|---|---|---|
| 8,736,925 B2 | 5/2014 | Mayer et al. | |
| 9,516,248 B2 | 12/2016 | Cohen et al. | |

(Continued)

FOREIGN PATENT DOCUMENTS

| | | |
|---|---|---|
| EP | 2088763 A2 | 8/2009 |
| JP | 2013530597 A | 7/2013 |
| WO | 2011138326 A1 | 11/2011 |

OTHER PUBLICATIONS

International Search Report dated Jul. 22, 2021 for corresponding International PCT Application No. PCT/CA2020/051476, 7 pages.

(Continued)

*Primary Examiner* — Marly S Camargo (57) ABSTRACT

Provided are apparatus, methods and techniques to perform a readout of a plurality (N) of Time Delay and Integration (TDI) pixel registers to receive respective signal charges at a plurality (N) of sense nodes (SNs). The readout uses a plurality (N) of charge steering (CST) gates to steer and demultiplex respective charges from respective pixel registers to corresponding SNs. Output is provided from the SNs for producing respective digital values (e.g. through parallel conversion using ADCs). In an embodiment, charges are transferred vertically to the CSTs for demultiplexing horizontally to the SNs. The CSTs may be configured in a multi-stage configuration to assist with good charge transfer. The CSTs may be associated with a barrier implant to assist with proper charge steering.

25 Claims, 7 Drawing Sheets

(51) Int. Cl.
*H04N 25/68* (2023.01)
*H04N 25/711* (2023.01)
*H04N 25/75* (2023.01)
*H04N 25/768* (2023.01)
*H04N 25/77* (2023.01)

(56) References Cited

U.S. PATENT DOCUMENTS

| | | | |
|---|---|---|---|
| 9,948,874 B2 | 4/2018 | Kaehler | |
| 11,212,474 B2* | 12/2021 | Nam | H04N 25/75 |
| 11,792,547 B2* | 10/2023 | Puchades | H04N 25/77 |
| 2004/0017224 A1 | 1/2004 | Tumer et al. | |
| 2006/0181627 A1 | 8/2006 | Farrier | |
| 2008/0079830 A1* | 4/2008 | Lepage | H04N 25/68 |
| | | | 348/295 |
| 2011/0019044 A1 | 1/2011 | Wang et al. | |
| 2011/0205100 A1* | 8/2011 | Bogaerts | H04N 25/767 |
| | | | 341/169 |
| 2011/0279725 A1 | 11/2011 | Cazaux et al. | |
| 2013/0057931 A1 | 3/2013 | Mayer et al. | |
| 2013/0076949 A1 | 3/2013 | Compton et al. | |
| 2013/0140609 A1 | 6/2013 | Mayer et al. | |
| 2014/0005443 A1* | 1/2014 | Faramarzpour | H04N 25/760 |
| | | | 250/208.1 |
| 2017/0085812 A1* | 3/2017 | Nam | H04N 25/60 |
| 2017/0180667 A1* | 6/2017 | Nie | H04N 25/77 |
| 2017/0264836 A1 | 9/2017 | Mandelli et al. | |
| 2019/0289237 A1 | 9/2019 | Verbugt et al. | |
| 2019/0313044 A1 | 10/2019 | Chuang et al. | |
| 2020/0068154 A1 | 2/2020 | Nam et al. | |
| 2023/0137365 A1* | 5/2023 | Hong | G09G 3/3291 |
| 2024/0210532 A1* | 6/2024 | Dutton | G01S 7/4861 |

OTHER PUBLICATIONS

Written Opinion dated Jul. 22, 2023 for corresponding International PCT Application No. PCT/CA2020/051476, 8 pages.
Thesis 2016 Time-Delay-Integration CMOS Image Sensor Design For Space Applications, 2016, 190 pages.
A Novel Sensor for High Resolution Earth Observation, Oct. 2018, 1 page.
Extended European Search Report Dated Aug. 8, 2024, 10 Pages for Corresponding European Patent Application No. 20952665.6.

* cited by examiner

X (arb. unit)

CHARGE DEMULTIPLEXING HIGH-SPEED CMOS TIME DELAY AND INTEGRATION IMAGING

FIELD

This disclosure relates to complementary metal-oxide-semiconductor (CMOS) time delay and integration (TDI) high fidelity imaging methods and apparatus thereof for parallel readout operation and more particularly to charge demultiplexing for high-speed charge-coupled CMOS Time Delay and Integration (TDI) imaging.

BACKGROUND

In a conventional CMOS TDI imager, the following row-by-row readout operation is performed. This sequential operation limits the sensor speed. 1. A sense node (SN) is reset to a reset drain voltage (VDD) through a reset gate (RST). 2. Signal charge in the last TDI stage is transferred to the SN. 3. The signal charge is converted to a signal voltage at the SN and is outputted via a source follower (SF). 4. The analog signal voltage is then converted to a digital value by an analog-to-digital converter (ADC).

It takes about a minimum of approximately 3 μs to complete one TDI row processing (i.e., a maximum line rate of approximately 300 kHz) in the current state-of-the-art CMOS TDI imager.

SUMMARY OF THE INVENTION

Embodiments herein relate to a high-speed charge-coupled CMOS TDI image sensor in which a plurality of charge-coupled device (CCD) pixels is arranged in a form of a matrix. In an embodiment, a column slice of such a pixel array comprises an M number of TDI imaging pixels, an N number of Charge STeering gates (CSTs), an N number of SNs, a global reset structure (e.g. RST and VDD) and the N number of parallel readout structures including the N number of SFs, the N number of sample and hold (S/H) capacitor circuits for correlated double sampling (CDS) operation and the N number of column-parallel ADCs, where N is equal to or less than M.

Provided are apparatus, methods and techniques to perform a readout of a plurality (N) of TDI pixel registers to receive respective signal charges at a plurality (N) of SNs. The readout uses a plurality (N) of CSTs to steer and demultiplex respective charges from respective pixel registers to corresponding SNs. Output is provided from the SNs for producing respective digital values (e.g. through parallel conversion using ADCs). In an embodiment, charges are transferred vertically to the CSTs for demultiplexing horizontally to the SNs. The CSTs may be configured in a multi-stage configuration to assist with good charge transfer. The CSTs may be associated with a barrier implant to assist with proper charge steering. The apparatus may be a high-speed charge-coupled CMOS TDI image sensor in which a plurality of CCD pixels is arranged in a form of a matrix. Such an image sensor may be configured for bidirectional operation.

In an embodiment, there is provided a method comprising: performing a readout of a plurality (N) of Time Delay and Integration (TDI) pixel registers to receive respective signal charges at a plurality (N) of sense nodes, wherein the readout uses a plurality (N) of charge steering gates to steer and demultiplex respective charges from respective pixel registers to the plurality of sense nodes; and providing output from the plurality of sense nodes for producing respective digital values.

In an embodiment, the method is performed by a high-speed CMOS TDI image sensor comprising a plurality of charge-coupled device (CCD) pixels arranged in a form of a CCD pixel matrix, a column slice thereof comprising the plurality (N) of TDI pixel registers; a plurality (N) of isolation (ISO) registers comprising the plurality (N) of CSTs; a plurality (N) of output structures comprising the plurality (N) of sense nodes, a global reset structure and a plurality of SFs; and a plurality (N) of parallel conversion components each comprising S/H capacitor arrays and a column-parallel ADC.

In an embodiment there is provided an apparatus comprising circuitry configured to perform a method according to any one of the method embodiments herein.

In an embodiment there is provided an apparatus comprising: a plurality (N) of Time Delay and Integration (TDI) pixel registers; a plurality (N) of isolation (ISO) registers comprising a plurality (N) of charge steering gates coupled to the plurality (N) of TDI pixel registers; a plurality (N) of output structures comprising a plurality (N) of sense nodes coupled to receive respective signal charges readout from the plurality (N) of TDI pixel registers as steered and demultiplexed by the plurality (N) of charge steering gates, the plurality (N) of sense nodes coupled to provide output to produce digital values.

In an embodiment, each of the plurality (N) of sense nodes is configured with circuitry providing parallel reset functionality. In an embodiment, each of the plurality (N) of sense nodes is coupled to a plurality (N) of sample and hold (S/H) capacitor circuits and a plurality (N) of column-parallel analog digital converters (ADCs) via a plurality (N) of source followers (SFs) to produce the respective digital values for each of the respective signal charges in parallel.

In an embodiment, the apparatus comprises a CMOS TDI image sensor wherein a plurality of CCD pixels is arranged in a form of a CCD pixel matrix, wherein a column slice thereof comprises the plurality of (N) TDI pixel registers, the plurality (N) of ISO registers comprising the plurality of (N) CSTs, the plurality (N) of output structures comprising the plurality (N) of sense nodes, a global reset structure providing the parallel reset functionality and the plurality (N) of SFs, the plurality (N) of S/H capacitor arrays and the plurality (N) of the column-parallel ADCs.

The present invention addresses the conventional, slow, sequential readout operation aforementioned by demultiplexing charges accumulated in multiple TDI rows to the corresponding readout structures, which enables fast, parallel readout operation.

DETAILED DESCRIPTION

Figures 1, 2, 3:
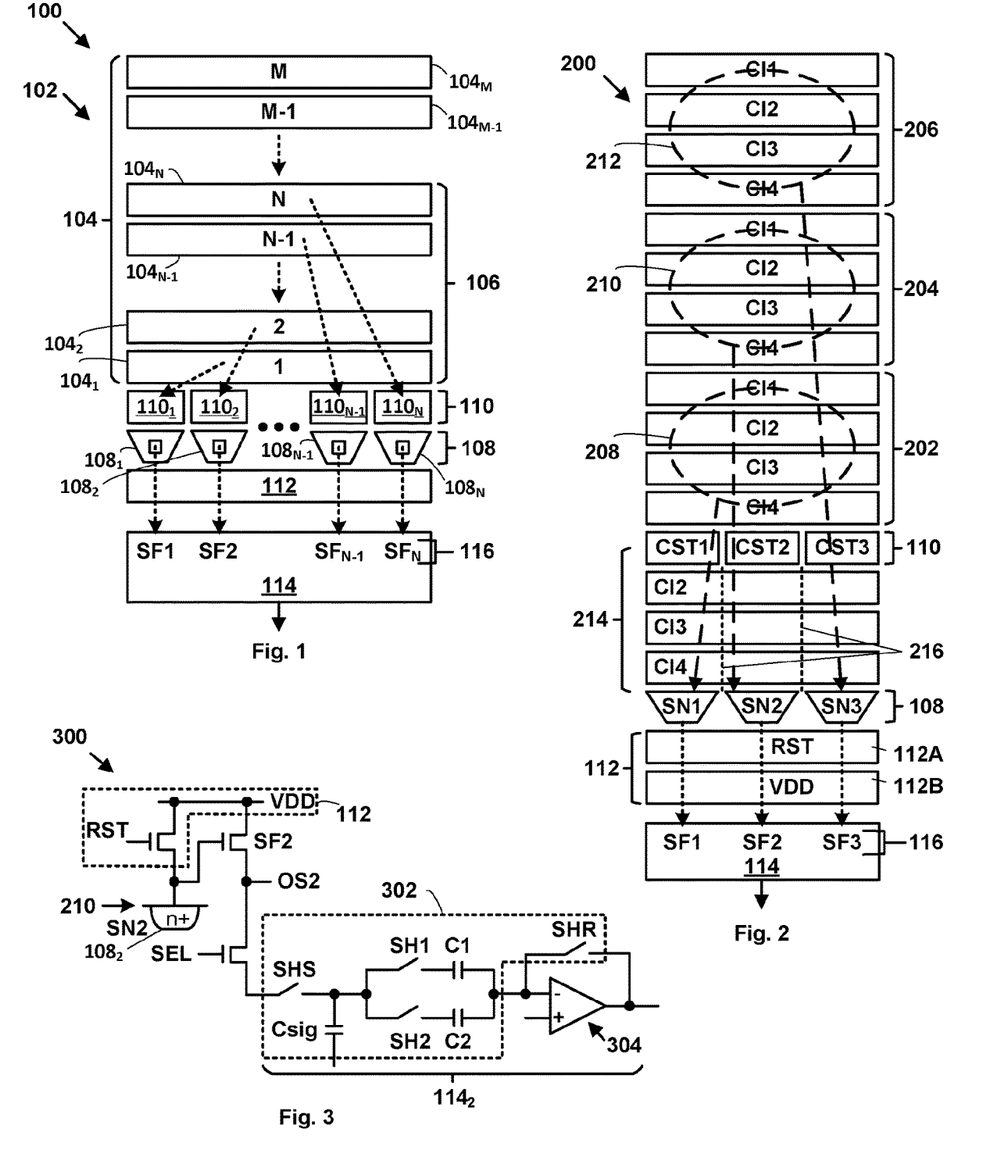
FIG. 1 is an illustration showing a column slice of a high-speed charge-coupled CMOS TDI imager pixel array in accordance with an embodiment.
FIG. 2 is an illustration showing a column slice of an imager pixel array, in accordance with an embodiment, configured for 3 TDI row operation.
FIG. 3 is a schematic diagram showing an embodiment of an S/H capacitor circuit and a column-parallel ADC providing parallel conversion functionality.

FIG. 1 is an illustration showing a column slice of a high-speed charge-coupled CMOS TDI imager pixel array 100 in accordance with an embodiment. Pixel array 100 is partial in that shown is a column slice 102 thereof, the pixel array 100 comprising additional columns. Column slice 102 comprises a plurality (M) of TDI registers 104 (e.g. pixel registers) comprising individual TDI (pixel) registers (e.g. $104_1, 104_2, \ldots, 104_{N-1}, 104_N, \ldots, 104_{M-1},$ and $104_M$), a plurality (N) of TDI registers 106 comprising a subset of the TDI registers $104_1, 104_2, \ldots$ and $104_N$, where N is less than or equal to M, and a plurality (N) of sense nodes (SNs) 108 comprising individual sense nodes (e.g. $108_1, 108_2, \ldots 108_{N-1},$ and $108_N$). The N SNs 108 are components of N output structures.

The plurality (M) of TDI registers 104 is coupled to the plurality (N) of sense nodes 108 to receive signal charges from the plurality N of TDI registers 106. The plurality (N) of sense nodes 108 are coupled to receive signal charges from the plurality (N) of TDI registers 106 via a plurality (N) of charge steering gates 110 comprising individual charge steering (CST) gates (e.g. $110_1, 110_2, \ldots 110_{N-1},$ and $110_N$). The N CSTs 110 are components of N isolation (ISO) registers.

Figure 4:
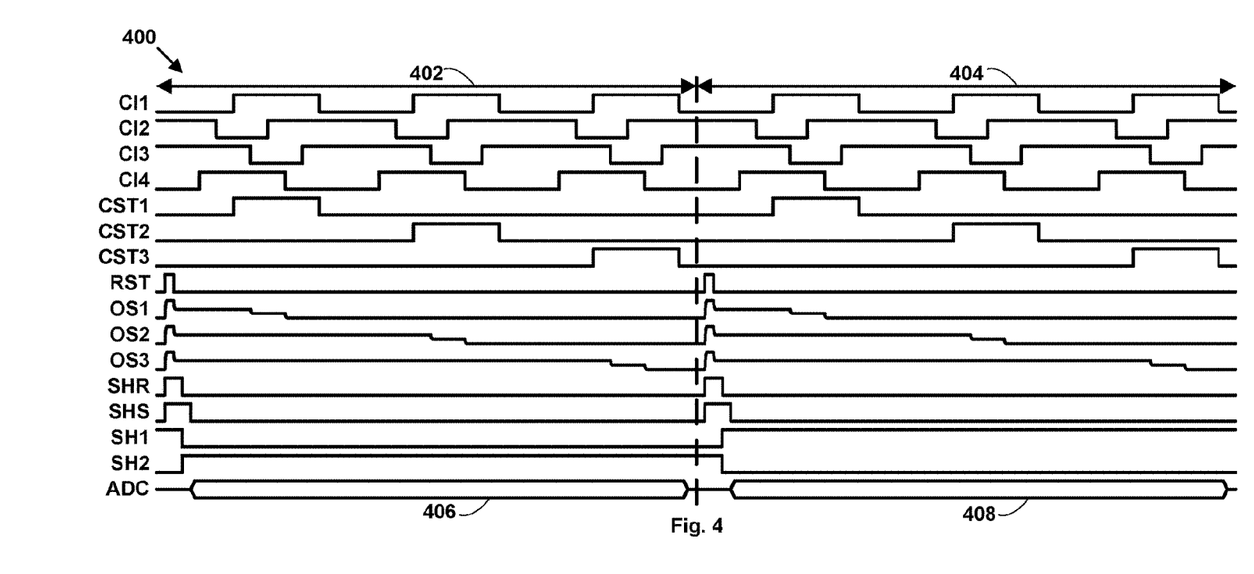
FIG. 4 is a diagram showing operational timing in accordance with an embodiment.

The N sense nodes 108 each have global signal reset functionality 112 and output to parallel conversion functionality 114 via N source followers (SFs) 116 to N respective correlated double sampling (CDS) and ADC circuitry as further described in FIGS. 3 and 4.

In contrast to a traditional readout, high-speed multiple TDI rows-based parallel operation is achieved, in accordance with an embodiment, as follows:

The N SNs 108 in the TDI column 102 are reset, in parallel, via functionality 112, ready to take (signal) charges transferred from the N TDI row pixel registers 106 out of the M TDI row pixel registers 104.

Each charge is transferred vertically from each of the N TDI pixel registers and is steered by each of the corresponding N CSTs and demultiplexed horizontally to each of the corresponding N SNs.

Each of the N signal charges stored at each of the N SNs is converted to a signal voltage in parallel.

Each of the analog signal voltages is outputted via each of the corresponding N SFs and then converted to a digital value, in parallel, by each of the corresponding N parallel conversion functionality 114. AD processing overlaps with subsequent charge transfer. That is, AD conversion of a current set of analog signal voltages is also performed in parallel while a next set of signal charges accumulated in the N TDI registers are transferred.

FIG. 2 is an illustration of a column slice of an imager array 200 configured for 3 TDI row operation. Imager array shows TDI row 1, 2, and 3 (e.g. 202, 204 and 206) where each row (202, 204 and 206) is clocked with 4 phase image register clocks, where the gate electrodes are shown as respectively as Clx where x=1, 2, 3 and 4. Clx in ISO rows 214 (e.g. of the ISO registers) between the N CSTs 110 and N SNs 108 are similarly clocked. As the N CSTs are in phase with Cl1 (see FIG. 4), no Cl1 is present in the ISO rows 214. FIG. 2 shows reset functionality 112 comprising a reset gate (RST) 112A and a reset drain (VDD) 112B. In an embodiment, functionality 112 is used for resetting the plurality of sense nodes in parallel where resetting comprises emptying the plurality of sense nodes to the reset drain voltage through the reset gate in parallel.

Each of the Clx's, are continuous horizontally in the ISO rows 214 as well as in active imaging TDI rows 202, 204 and 206, while each of the CSTs is discontinuous (e.g. each is separate and not a continuous horizontal structure). FIG. 2 shows a plurality (N-1) of channel stops 216 in the ISO rows 214 to limit the spread of charges between adjacent respective channels (not shown per se), where the respective channels extend between corresponding CSTs 110 and SNs 108 in the ISO rows 214. Though not shown, additional channel stops are present in active imaging TDI rows 202, 204 and 206 such as between adjacent TDI columns. In an embodiment, the continuous Clx gates eliminate the need for x-y matrix addressing (e.g. targeted individual addressing) both to the Clx of the individual pixels and in the ISO rows.

FIG. 3 is a schematic diagram of a readout circuit 300 for a single TDI row (e.g. second row 204) Readout circuit 300 comprises a corresponding source follower SF2, a sample and hold (S/H) capacitor array 302 and a comparator 304 of a column-parallel ADC for the second TDI row 204. Collectively, SF2, S/H capacitor (array) circuit 302 and a column-parallel ADC 304 provide parallel conversion functionality $114_2$ for the second TDI row 204, it being understood that corresponding readout circuits for the first row 202 and third row 206 are not shown. FIG. 4 shows operational timing 400 for image array 200 and readout circuits such as circuit 300.

Operational timing 400 shows a charge transfer period 402 for three TDI rows when respective charges at a present time are transferred, a charge transfer period 404 for three TDI rows when respective charges at a next time are transferred, an AD conversion window 406 for three TDI rows during which time charges from a previous period are converted and an AD conversion window 408 for three TDI rows during which time charges from a present period are converted. FIG. 4 thus shows the overlap between charge transfer and AD conversion, where AD conversion lags by one period.

When charge accumulated in the first TDI row 202 is demultiplexed to SN1 (a first of SNs 108), only CST1 (a first of CSTs 110) is clocked high in synchronization with Cl1 while CST2 and CST3 (respectively second and third CSTs of CSTs 110) are held low as shown in FIG. 4.

Similarly, when charges accumulated in the 2nd and 3rd TDI rows (204 and 206) are transferred vertically, the corresponding CST2 and CST3 (a second and third CST of CSTs 110) are respectively clocked high in synchronization with Cl1, while the respective other two of the CSTs (e.g. respectively CST1+CST3 and CST1+CST2) are held low for horizontal charge demultiplexing. These charge steering operations are indicated by the dashed line structures 208, 210 and 212 in FIG. 2.

In FIG. 4, OSx where x=1, 2 and 3 are the analog voltage signals at the output of the respective SFs 116 (e.g. SF1, SF2 and SF3). OS2 is also shown in FIG. 3. After charge demultiplexing of the three TDI rows 202, 204 and 206 is completed, the analog signal voltages are sampled and AD converted in parallel via the N parallel conversion functionality 114 as follows, with reference to FIGS. 3 and 4.

When both SHS (sample and hold signal) and SHR (sample and hold reset) switches are closed, a pixel reference level is sampled to C1 when a first switch (SH1) is closed and a second switch (SH2) is open. Then both the SHR and the SH1 switches are open to hold the reference level at C1. At the same time, the SH2 switch is closed for CDS operation of the pixel signal voltage sampled at Csig, which was transferred from the second TDI row from a previous time, with the pixel reference level held at C2, which was sampled from a previous time. Then the SHS switch is open for the next cycle. The AD conversion of the signal voltage of the previous TDI row takes place while the signal charge stored in the present TDI row is demultiplexed. This completes one cycle of the operational timing diagram provided in FIG. 4.

For the next cycle, when both SHS and SHR switches are closed again, the pixel reference level is sampled to C2 when a SH2 switch is closed and a SH1 switch is open. Then both the SHR and the SH2 switches are open to hold the reference level at C2. At the same time, the SH1 switch is closed for CDS operation of the pixel signal voltage sampled at Csig, which is transferred from the present second TDI row, with the present pixel reference level held at C1. Then the SHS switch is open again for the next cycle. The AD conversion of the signal voltage of the present TDI row takes place while the signal charge stored in the next TDI row is demultiplexed.

Thus, with reference to FIG. 3, the respective circuitry operates to convert respective signal voltages by the following operations of S/H capacitor array circuitry in a ping-pong fashion: sampling in parallel respective reference voltages at a present time to the respective first reference capacitors of the respective S/H capacitor arrays; sampling in parallel the respective earlier in time signal voltages to respective signal capacitors; and providing in parallel respective CDS voltages from the respective earlier in time reference voltages sampled at respective second reference capacitors and the respective earlier in time signal voltages sampled at the signal capacitors to respective column-parallel ADCs to produce the respective earlier in time digital values.

In an embodiment, operations further comprise: in further parallel, receiving the next in time respective reference voltages to the respective second reference capacitors and the present signal voltages to the respective signal capacitors; and providing in parallel respective CDS voltages from the respective present reference voltages sampled at the respective first reference capacitors and the respective present signal voltages sampled at the signal capacitors to the respective column-parallel ADCs to produce the respective present digital values.

In an embodiment, converting respective signal voltages in parallel to respective digital values is performed at a present time further in parallel with a performing of a readout of a next in time plurality of respective signal charges to the plurality of sense nodes. In an embodiment, performing the readout of the plurality of TDI registers to receive the respective signal charges is performed at a present time and further in parallel with a converting of respective earlier in time signal voltages to respective earlier in time digital values.

Multi-Stage Charge Steering

Figure 5A:
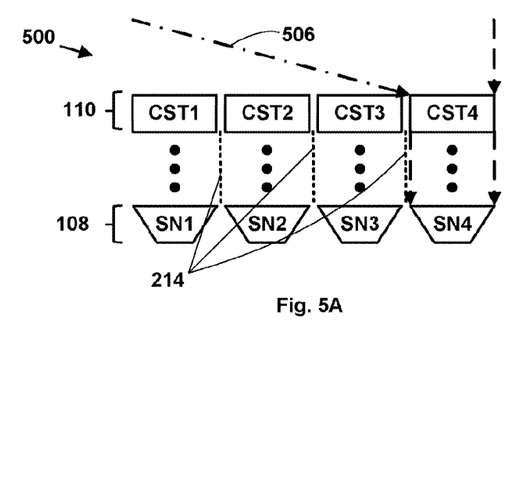
FIGS. 5A and 5B are respective embodiments of a portion of a column slice of an imager pixel array configured for 4 TDI row operation.
Figure 5B:
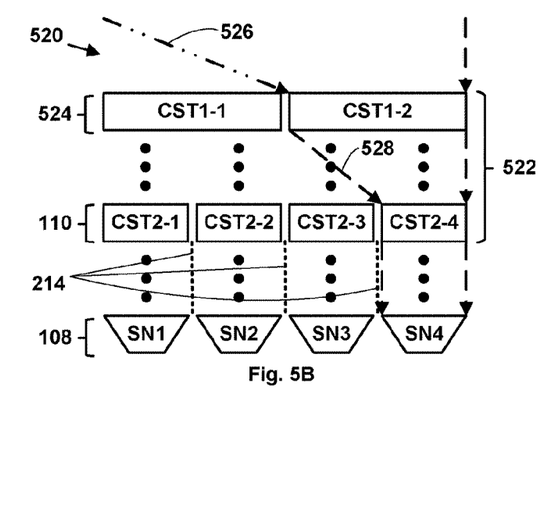

FIGS. 5A and 5B are respective embodiments of a portion (respectively 500 and 520) of a column slice of an imager pixel array configured for N=4 TDI row operations. Portion 500 shows corresponding N=4 sense nodes 108 comprising SN1, SN2, SN3 and SN4 for the 4 TDI rows (not shown). Portion 500 shows N=4 CSTs 110 comprising CST1, CST2, CST3 and CST4 in a single stage or layer, similar in configuration to the N=3 CSTs 110 of the N=3 TDI row embodiment of FIG. 2. In contrast, portion 520 shows corresponding N=4 sense nodes 108 and a multi-stage configuration 522 of CSTs. Here, the N=4 CSTs 110 define a second layer or stage comprising CST2-1, CST2-2, CST2-3 and CST2-4 that are adjacent to the SNs 502. The N CSTs with channels to the SNs are a last layer of the cascade. Note the presence of channels stops 216 between adjacent respective channels. Further, portion 520 comprises a first layer 524 (an example of a prior layer) of CSTs comprising CST1-1 and CST1-2 that feeds the second layer of CSTs 110. Thus in FIG. 5B, the 1-pixel column is gradually demultiplexed to a half of the column via a first stage of CSTs 524 and then to another half (i.e. a quarter) of the column via a second stage 110 for good charge transfer when compared to direct demultiplexing to a quarter of the column through CST1-CST4 110 only as shown in FIG. 5A.

In portion 500, charge at the far left side of the pixel is steered to the far right via the CST4 as indicated by the single dot and dashed arrow 506. Whereas, in portion 520, the same charge travels in two stages, each transfer comprising a smaller transfer than the total transfer indicated by single dot and dashed arrow 506. In portion 520, the same charge first travels less (of a distance) to the CST1-2 as indicated by the double dot and dashed arrow 526 and then travels to the CST2-4 as indicated by the even dashed arrow 528 in the cascade (or multi-staged) configuration of portion 520.

In an embodiment, this cascade configuration may be extendable to any k number of the stages with the $2^k$ number of the last CST gates for better charge transfer. Between stages of CSTs, in the embodiment, no channel stop is present for steering operations but channel stops 216 are present between the last layer of CSTs 110 and the SNs 108 as noted.

Figure 6:
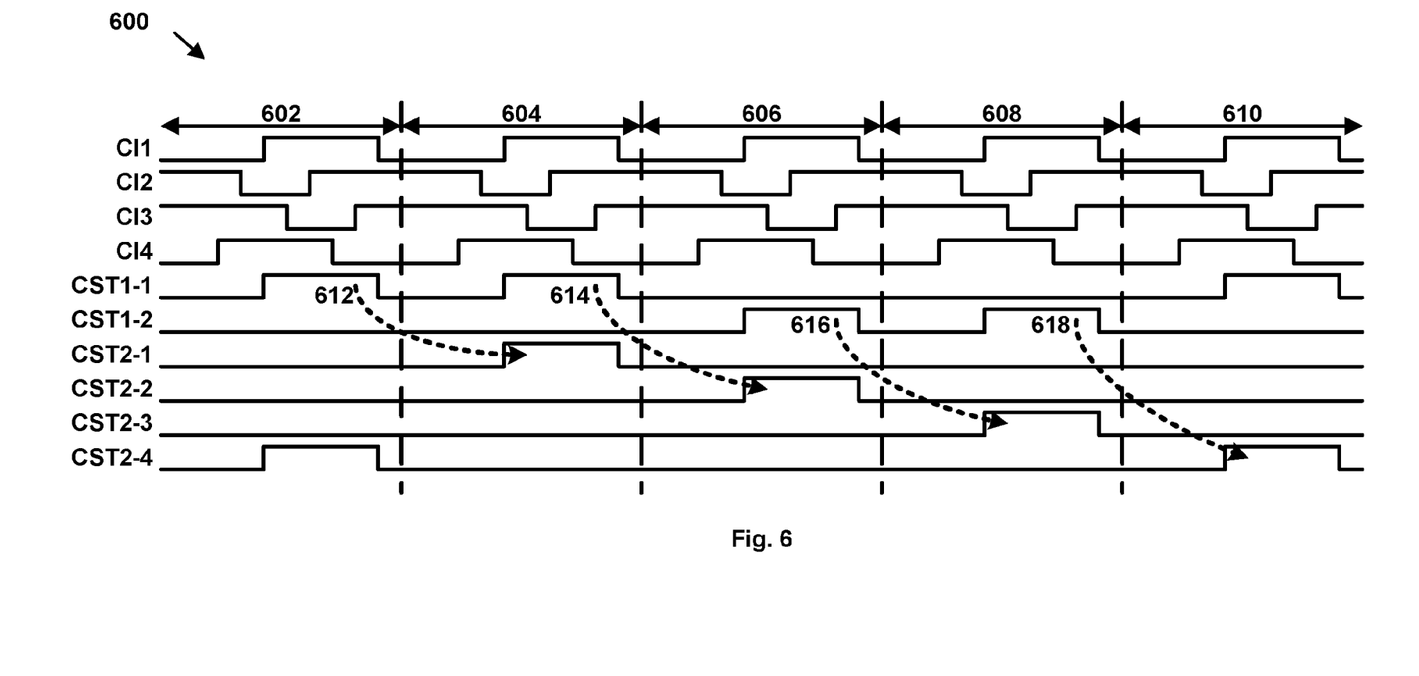
FIG. 6 is a diagram showing operational timing for two-stage configuration for N=4 TDI row operations

FIG. 6 is a diagram showing operational timing 600 for 2-stage configuration for N=4 TDI row operations such as for the configuration of FIG. 5B. Operational timing 600 shows periods 602, 604, 606, 608 and 610 for, respectively, TDI rows 1 to 4 of a current time and TDI row 1 of a next time. From FIG. 6 it is observed that: CST1-1 is clocked high during the time which CST2-1 and CST2-2 are clocked high (even dashed arrows 612 and 614); CST1-2 is clocked high during the time which CST2-3 and CST2-4 are clocked high (even dashed arrows 616 and 618); and CST2-x lags behind CST1-x by n line periods where n is the number of the ISO rows between CST1-x and CST2-x.

Barrier Implant (BIM)

Figure 7:
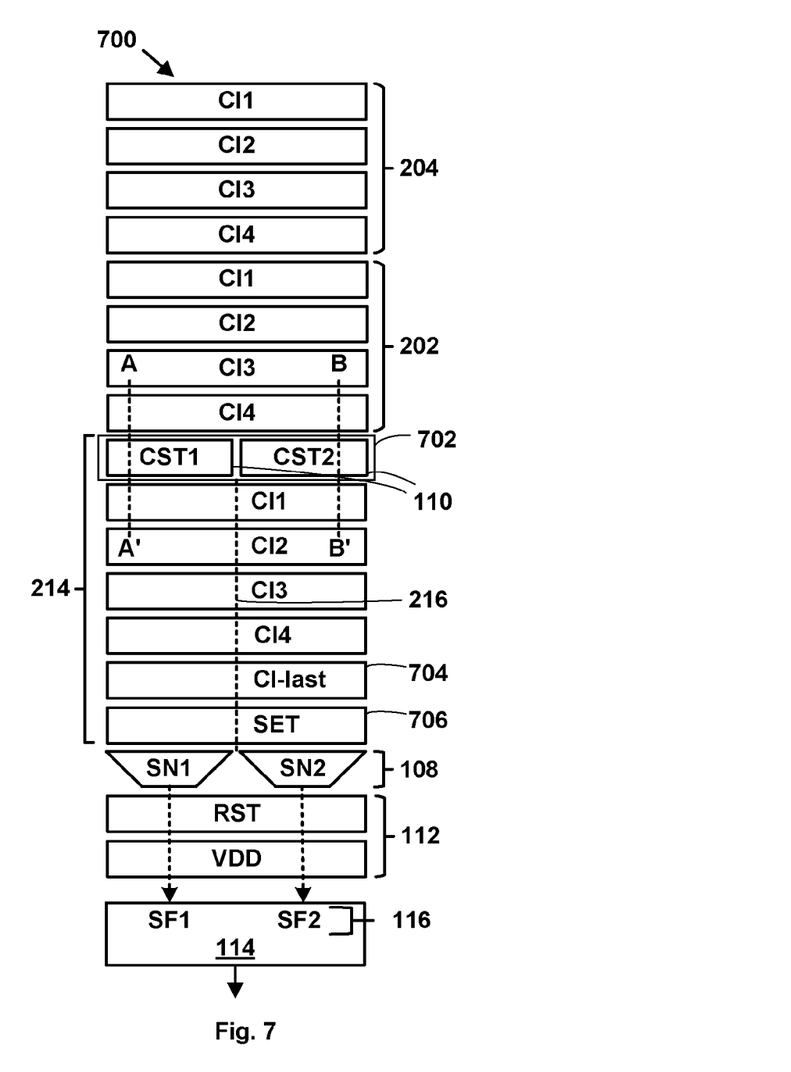
FIG. 7 is an illustration showing a column slice of a high-speed charge-coupled CMOS TDI imager pixel array, in accordance with an embodiment, configured for 2 TDI row operations and using charge steering gates associated with a barrier implant.
Figure 8:
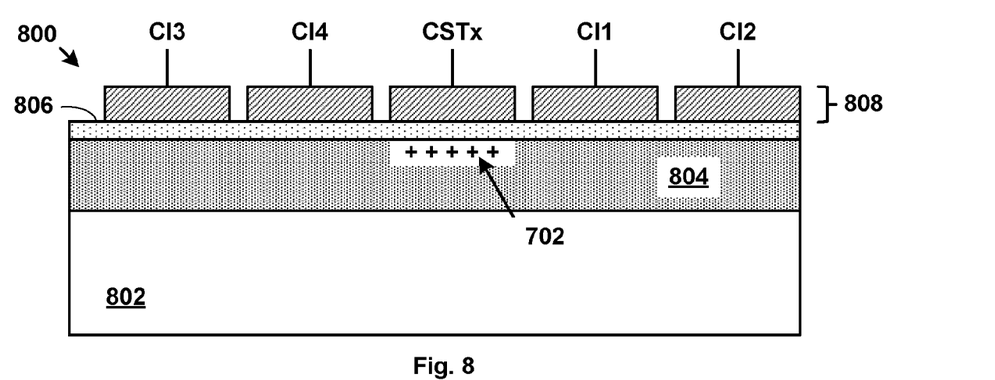
FIG. 8 is a cross-sectional view of FIG. 7 along either line A-A' or B-B' in accordance with an embodiment.
Figure 9:
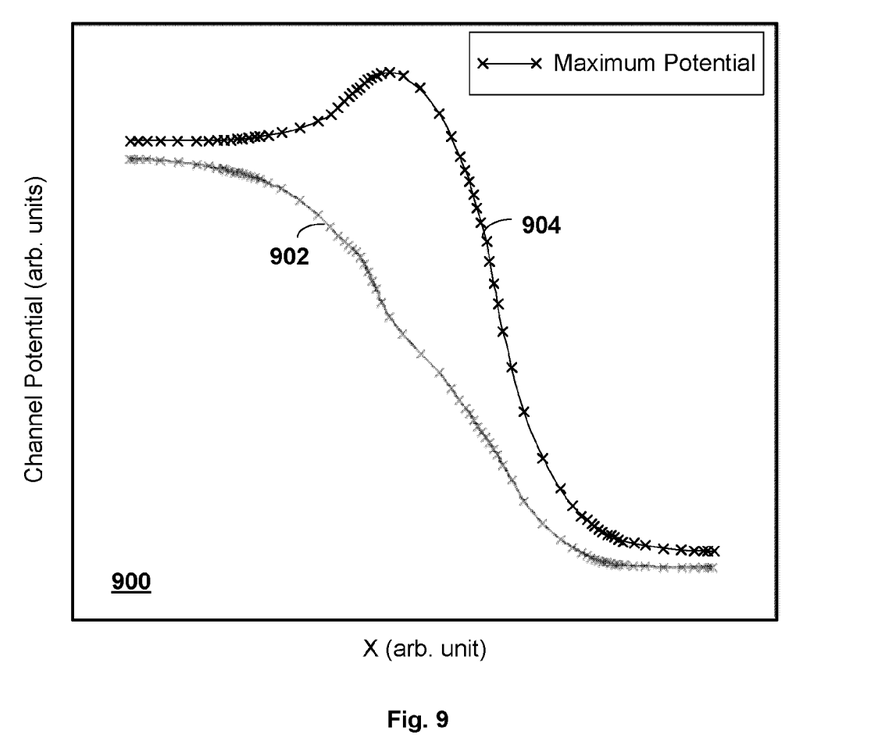
FIG. 9 is a graph showing simulated channel potentials along the cutlines A-A' and B-B' of FIG. 7, when CST1 and CST2 are clocked high and low, respectively.
Figure 10:
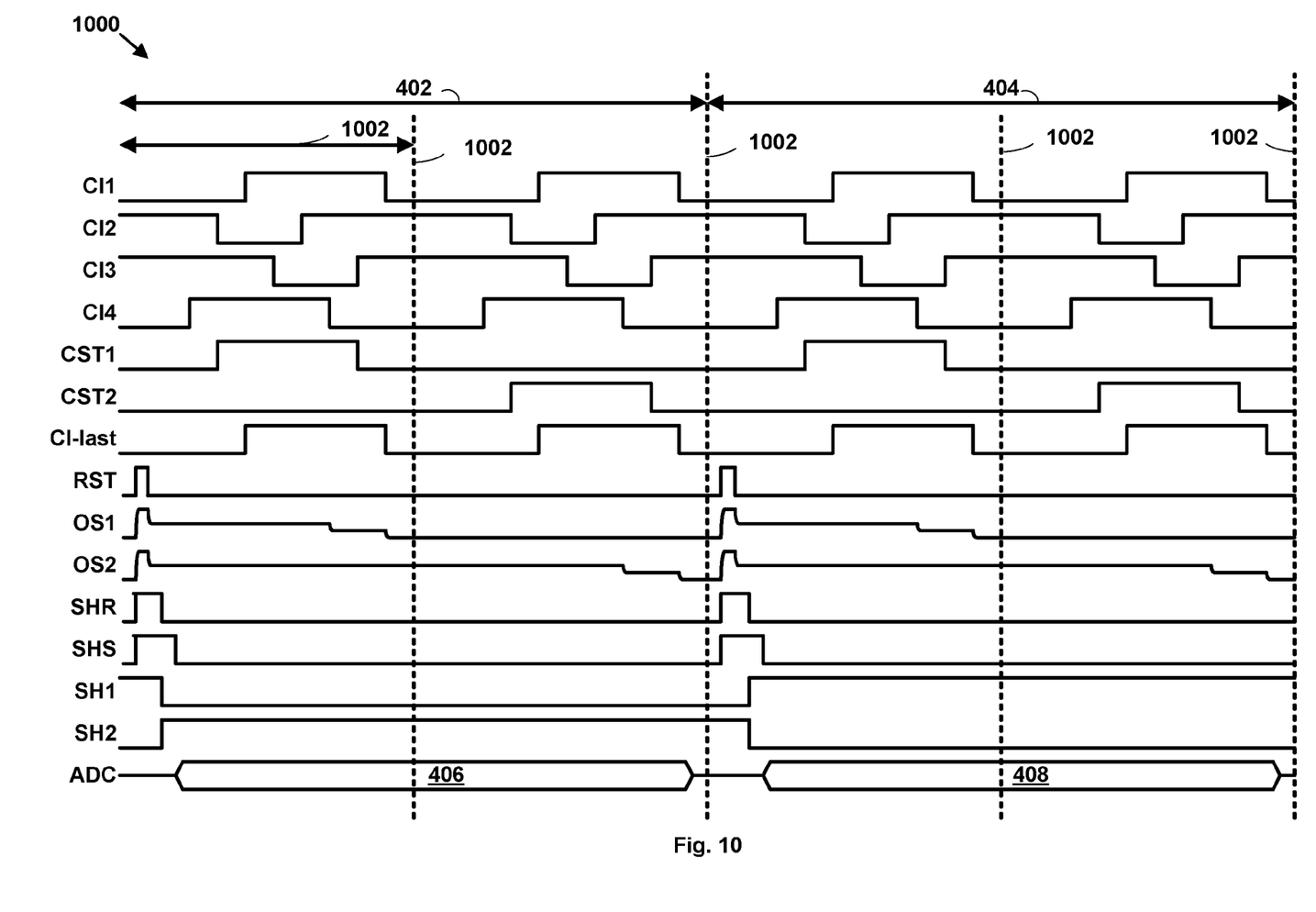
FIG. 10 is a diagram showing operational timing for a high-speed charge-coupled CMOS TDI imager pixel array of FIG. 7, in accordance with an embodiment.

FIG. 7 is an illustration showing a column slice of a high-speed charge-coupled CMOS TDI imager pixel array 700, in accordance with an embodiment, configured for N=2 TDI row operations and using charge steering gates 110 associated with a barrier implant (BIM) 702. ISO rows 214 include additional gates Cl-last 704 and SET 706. FIG. 8 is a cross-sectional view of FIG. 7 along either line A-A' or B-B' showing a portion 800 of imager pixel array 700 including a charge steering gate CSTx, x=1 or 2, corresponding to one of CSTs 110 associated with the barrier implant 702, in accordance with an embodiment. FIG. 9 is a graph 900 showing simulated channel potentials 902 and 904 along the cutlines A-A' and B-B' when CST1 and CST2 are clocked high and low, respectively. FIG. 10 is a diagram showing operational timing 1000 in accordance with an embodiment. The operational timing 1000 relates to the high-speed charge-coupled CMOS TDI imager pixel array 700. The operational timing 1000 shows timing periods 402, 404, 406 and 408, similar to the embodiment of FIG. 4 but where N=2, and with different specific timing for structures in the embodiment of FIG. 7. The operational timing 1000 further includes timing for the last AC gate electrode Cl-last 704 prior to a DC gate SET 706.

In an embodiment, as shown in FIG. 8, portion 800 comprises a silicon substrate 802 carrying a buried channel 804 having gate oxide 806 thereon. On the gate oxide 806 are various gate electrodes (collectively 808) including electrodes for the four phase clocks (Cl1, Cl2, Cl3 and Cl4) and the charge steering gate CSTx. BIM 702 is positioned in buried channel 804 under CSTx and under gate oxide 806. BIM 702 comprises p-type dopants (e.g. boron) to create a potential barrier when the gate CSTx is clocked low. Graph 900 shows a simulation of resultant channel potential values. The use of BIM 702 provides assistance so that charge demuxing is proper and so that charge does not leak over the CST when it is clocked low.

In the BIM embodiment, timing as shown in FIG. 10 is different compared to the timing of FIG. 4 for a single layer non-BIM embodiment. Charge may not be stored under CSTs with BIM, unlike CSTs without BIM. Though illustrated in an embodiment comprising a single layer of CSTs 110, BIMs are useful with mutli-staged CSTs.

Bidirectionality

Figure 11A:
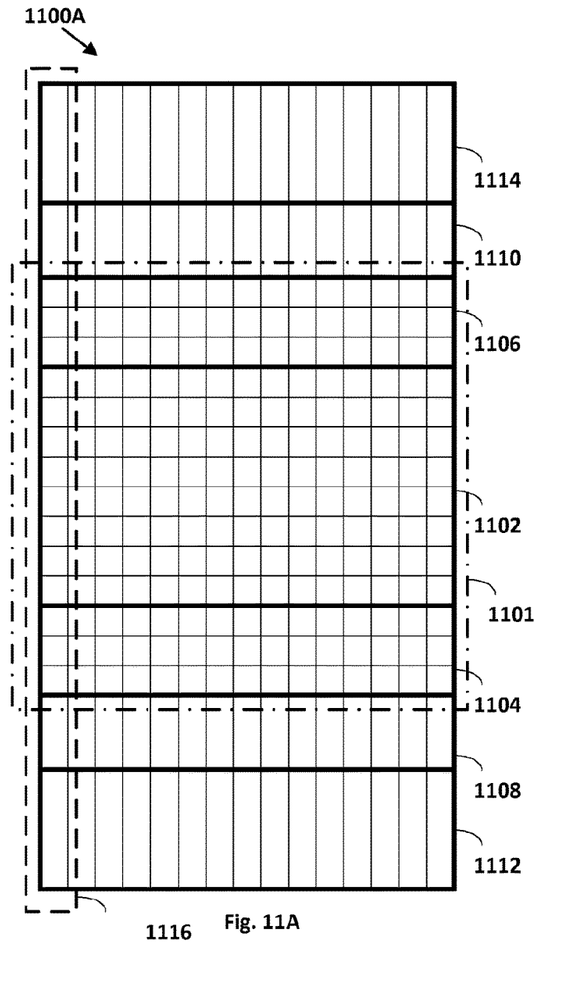
FIGS. 11A and 11B are block diagrams showing a column slice of a high-speed charge-coupled CMOS TDI imager pixel matrix configured for bidirectional operations in accordance with respective embodiments.
Figure 11B:
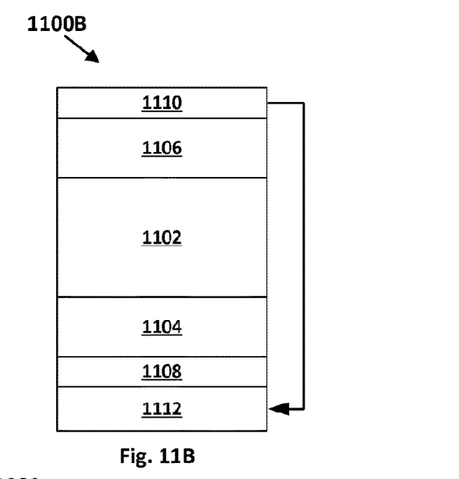

FIGS. 11A and 11B are block diagrams showing a high-speed charge-coupled CMOS TDI imager 1100A and 1100B configured for bidirectional operations in accordance with respective embodiments. Bidirectional operations are responsive to a direction of scanning (e.g. forward and reverse) performed by the CMOS TDI imager. In a first bidirectional embodiment, there is shown a CCD pixel array 1101, marked by a single dot dashed box, comprising a plurality of TDI pixel registers 1102 having coupled at respective ends thereof a bottom (forward) plurality of ISO registers 1004 and a top (reverse) plurality of ISO registers 1006.

In an embodiment, the respective ISO registers 1104 and 1106 comprise CSTs 110. The respective ISO registers 1104 and 1106 are connected to respective pluralities of output structures 1108 and 1110 comprising SNs 108, reset functionality 112 and SFs 116 (not shown in FIG. 11A) and the output structures 1108 and 1110 are coupled to respective pluralities of S/H capacitor array circuits and column-parallel ADCs 1112 and 1114 respectively.

FIG. 11A shows a representative column slice 1116 of CMOS TDI imager 1100A, marked by an even dashed line. The column slice 1116 comprises a column subset of the TDI pixel registers 1102, a column subset of the ISO registers 1104 and 1106, a column subset of each of the output structures 1108 and 1110 and a column subset of each of the S/H capacitor array circuits and the column-parallel ADCs 1112 and 1114. The column subset of the TDI pixel registers 1102 is equivalent to the plurality of M TDI pixel registers 104.

In a second bidirectional embodiment 1100B, the respective output structures 1108 and 1110 at respective ends of the CCD pixel array 1101 are multiplexed to S/H capacitor arrays and column-parallel ADCs 1112 located at one end of the CMOS TDI imager 1100A.

It will be understood that FIGS. 11A and 11B are simplified and may be implemented using the CSTs 110, etc. and readout circuitry 300 previously shown and described, with suitable adaptation.

Figure 12:
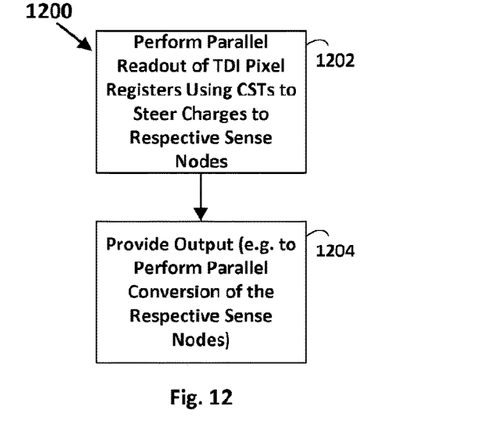
FIG. 12 is a flowchart showing charge demultiplexing high-speed CMOS TDI imaging operations in accordance with an embodiment.

FIG. 12 is a flowchart showing operations 1200 in accordance with an embodiment. In one example, the operations are performed by an apparatus comprising circuitry. In an embodiment the apparatus comprises circuitry as shown in any of the respective embodiments of FIGS. 1, 2, 7, 11A and 11B. At 1202 operations perform a readout of a plurality (N) of TDI pixel registers to receive respective signal charges at a plurality (N) of sense nodes, wherein the readout uses a plurality (N) of charge steering gates to steer and demultiplex respective charges from respective pixel registers to the plurality of sense nodes. At 1204 operations provide output from the plurality of sense nodes to produce respective digital values. In an embodiment, the output is used to perform a parallel conversion of the plurality of sense nodes. In an embodiment, the operations to perform parallel conversion include: converting the respective signal charges in parallel to respective signal voltages; and converting the respective signal voltages in parallel to respective digital values.

In an embodiment, operations include resetting the plurality of sense nodes in parallel to receive the respective signal charges. Resetting the plurality of sense nodes in parallel comprises emptying the plurality of sense nodes to a reset drain voltage through reset gates in parallel.

In an embodiment, the charges are transferred vertically, steered by the plurality (N) of charge steering gates for demulitplexing horizontally to the plurality of sense nodes.

In an embodiment, the plurality (N) of charge steering gates defines a last stage of steering gates and operations comprise transferring the charges (e.g. from the TDI rows) to a prior stage of steering gates, in a cascade for steering to the last stage of steering gates.

In an embodiment, each charge steering gate of the plurality (N) of charge steering gates is associated with (e.g. receives) a respective barrier implant (BIM) defining a potential barrier when each charge steering gate is clocked low.

In an embodiment multi-phase image register clocks are used to clock respective ones of the pixel registers, respective ones of the charges steering gates and respective ones of a plurality (N) of ISO registers for transferring the charges. In an embodiment, respective gate electrodes (Clx) are associated with respective phases of the clocks, which respective Clx are continuous horizontally, to eliminate x-y matrix addressing to the respective Clx in the ISO registers. In an embodiment, channel stops are used between channels extending from respective ones of the plurality (N) of charge steering gates to respective ones of the plurality (N) of sense nodes to avoid charge mixing between channels in the ISO registers.

In an embodiment, each of the sense nodes is coupled to respective source followers (SF) to provide respective signal voltages for conversion to respective digital values.

In an embodiment, the operations are performed by a high-speed CMOS TDI image sensor comprising a plurality of CCD pixels arranged in a form of a matrix, a column slice thereof comprising the plurality of TDI pixel registers, the plurality of ISO registers comprising CSTs, the plurality of output structures comprising the plurality of sense nodes, a global reset structure and the plurality of SFs, the plurality of S/H capacitor arrays and the plurality of the column-parallel ADCs.

In a bidirectional embodiment, forward sense nodes are coupled at one end of the CCD pixel array; reverse sense nodes are coupled at another end of the CCD pixel array; and the operations are performed using one of the forward sense nodes and the reverse sense nodes as the plurality of sense nodes in response to a direction of scanning.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise", "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A method comprising:
performing a read out of a plurality (N) of Time Delay and Integration (TDI) pixel registers to receive respective signal charges at a plurality (N) of sense nodes, wherein the readout uses a plurality (N) of charge steering gates to steer and demultiplex respective charges from respective pixel registers to the plurality of sense nodes; and
providing output from the plurality of sense nodes for producing respective digital values.

2. The method of claim 1 comprising resetting the plurality of sense nodes to receive the respective signal charges.

3. The method of claim 2, wherein resetting the plurality of sense nodes comprises emptying the plurality of sense nodes to a reset drain voltage through reset gates.

4. The method of claim 1, wherein the charges are transferred vertically, steered by the plurality (N) of charge steering gates for demultiplexing horizontally to the plurality of sense nodes.

5. The method of claim 1, wherein the plurality (N) of charge steering gates defines a last stage of charge steering gates and wherein the method comprises transferring the charges to a prior stage of steering gates, in a cascade, for steering to the last stage of charge steering gates.

6. The method of claim 1, wherein each charge steering gate of the plurality (N) of charge steering gates receives a respective barrier implant (BIM) defining a potential barrier when each charge steering gate is clocked low.

7. The method of claim 1, comprising:
clocking respective ones of the pixel registers, respective ones of the charges steering gates and respective ones of a plurality (N) of isolation (ISO) registers for transferring the charges using multi-phase image register clocks;
using respective gate electrodes (Clx) associated with respective phases of the multi-phase image register clocks, which respective Clx are continuous horizontally, to eliminate x-y matrix addressing to the respective Clx in the ISO registers; and
using channel stops between channels extending from respective ones of the plurality (N) of charge steering gates to respective ones of the plurality (N) of sense nodes to avoid charge mixing between channels in the ISO registers.

8. The method of claim 4, wherein to transfer charge from a one of the pixel registers to a corresponding one of the charge steering gates, only the corresponding one of the charge steering gates is clocked high while the remaining of the plurality (N) of charge steering gates are clocked low.

9. The method of claim 1, wherein each of the sense nodes is coupled to respective source followers (SFs) to provide the respective signal voltages for conversion to the respective digital values.

10. The method of claim 1, wherein the output is provided to perform a parallel conversion of the plurality of sense nodes to produce the respective digital values.

11. The method of claim 10, wherein to perform the parallel conversion comprises:
converting the respective signal charges in parallel to respective signal voltages; and
converting the respective signal voltages in parallel to respective digital values.

12. The method of claim 11, wherein converting the respective signal voltages in parallel to respective digital values is performed at a present time further in parallel with a performing of a readout of a next in time plurality of respective signal charges to the plurality of sense nodes.

13. The method of claim 1, wherein performing the readout of the plurality of TDI registers to receive the respective signal charges is performed at a present time and further in parallel with a converting of respective earlier in time signal voltages to respective earlier in time digital values.

14. The method of claim 1, wherein the method is performed by a high-speed CMOS TDI image sensor comprising a plurality of charge-coupled device (CCD) pixels arranged in a form of a CCD pixel matrix, a column slice thereof comprising the plurality (N) of TDI pixel registers; a plurality (N) of isolation (ISO) registers comprising the plurality (N) of CSTs; a plurality (N) of output structures comprising the plurality (N) of sense nodes, a global reset structure and a plurality of SFs; and a plurality (N) of parallel conversion components each comprising S/H capacitor arrays and a column-parallel ADC.

15. The method of claim 14, wherein:
forward sense nodes are coupled at one end of the CCD pixel matrix;
reverse sense nodes are coupled at another end of the CCD pixel matrix; and
the method is performed using one of i) the forward sense nodes and ii) the reverse sense nodes as the plurality (N) of sense nodes in response to a direction of scanning.

16. An apparatus comprising:
a plurality (N) of Time Delay and Integration (TDI) pixel registers;
a plurality (N) of isolation (ISO) registers comprising a plurality (N) of charge steering gates coupled to the plurality (N) of TDI pixel registers;
a plurality (N) of output structures comprising a plurality (N) of sense nodes coupled to receive respective signal charges readout from the plurality (N) of TDI pixel registers as steered and demultiplexed by the plurality (N) of charge steering gates, the plurality (N) of sense nodes coupled to provide output to produce digital values;
wherein:
each of the plurality (N) of sense nodes is configured with circuitry providing parallel reset functionality; and
each of the plurality (N) of sense nodes is coupled to a plurality (N) of sample and hold (S/H) capacitor circuits and a plurality (N) of column-parallel analog digital converters (ADCs) via a plurality (N) of source followers (SFs) to produce the respective digital values for each of the respective signal charges in parallel.

17. The apparatus of claim 16, wherein the charges are transferred vertically, steered by the plurality (N) of charge steering gates for demultiplexing horizontally to the plurality of sense nodes.

18. The apparatus of claim 16, wherein the plurality (N) of charge steering gates defines a last stage of charge steering gates and wherein the apparatus comprises a prior stage of steering gates coupled to the TDI pixel registers and to the last stage of charge steering gates, in a cascade, for steering the charges to the last stage of charge steering gates.

19. The apparatus of claim 16, wherein each charge steering gate of the plurality (N) of charge steering gates receives a respective barrier implant (BIM) defining a potential barrier when each charge steering gate is clocked low.

20. The apparatus of claim 16, comprising:
multi-phase image register clocks to clock respective ones of the pixel registers, respective ones of the charges steering gates and respective ones of the ISO registers for transferring the charges;
respective gate electrodes (Clx) associated with respective phases of the multi-phase image register clocks, which respective Clx are continuous horizontally, to eliminate x-y matrix addressing to the respective Clx in the ISO registers; and
channel stops between channels extending from respective ones of the plurality (N) of charge steering gates to respective ones of the plurality (N) of sense nodes to avoid charge mixing between channels in the ISO registers.

21. The apparatus of claim 17 configured to transfer charge from a one of the pixel registers to a corresponding one of the charge steering gates, the apparatus clocking high only the corresponding one of the charge steering gates while clocking low the remaining of the plurality (N) of charge steering gates.

22. The apparatus of claim 16, wherein each of the sense nodes is coupled to the respective S/H capacitors via SFs for CDS operation.

23. The apparatus of claim 21, wherein the apparatus is configured to readout next in time respective signal charges to the sense nodes while the column-parallel ADCs convert the respective signal charges from a present time.

24. The apparatus of claim 16 comprising a complementary metal-oxide-semiconductor (CMOS) TDI image sensor wherein a plurality of charge-coupled device (CCD) pixels is arranged in a form of a CCD pixel matrix, wherein a column slice thereof comprises the plurality of (N) TDI pixel registers, the plurality (N) of ISO registers comprising the plurality of (N) CSTs, the plurality (N) of output structures comprising the plurality (N) of sense nodes, a global reset structure providing the parallel reset functionality and the plurality (N) of SFs, the plurality (N) of S/H capacitor arrays and the plurality (N) of the column-parallel ADCs.

25. The apparatus of claim 24 comprising:
forward sense nodes coupled at a first end of the CCD pixel matrix; and
reverse sense nodes coupled at a second end of the CCD pixel matrix;
for bidirectional operation; and
wherein one of i) the forward sense nodes and ii) the reverse sense nodes selectively define the plurality (N) of sense nodes in response to a direction of scanning.

* * * * *